United States Patent [19]

Phelps

[11] Patent Number: 5,033,220
[45] Date of Patent: Jul. 23, 1991

[54] ARROWHEAD FOR BOW FISHING ARROWS

[76] Inventor: J. Gary Phelps, 2805 SE. 80th St., Ocala, Fla. 32676

[21] Appl. No.: 400,865

[22] Filed: Aug. 30, 1989

[51] Int. Cl.⁵ ..................... A01K 81/00; A01K 91/00; F41B 5/02
[52] U.S. Cl. ........................................ 43/6; 273/419; 273/422
[58] Field of Search ...................... 43/6; 273/416, 419, 273/421, 422; 124/41 R; 403/327, 330

[56] References Cited

U.S. PATENT DOCUMENTS

| | | | |
|---|---|---|---|
| 1,581,321 | 4/1926 | Raithel | 43/6 |
| 1,604,713 | 10/1926 | Norlund | 43/6 |
| 2,758,405 | 8/1956 | Hertel | 43/6 |
| 2,806,317 | 9/1957 | Minisini | 43/6 |
| 3,004,362 | 10/1961 | Day | 43/6 |
| 3,227,454 | 1/1966 | Ellenburg | 43/6 X |
| 3,405,472 | 10/1968 | Guidry | 43/6 |
| 3,527,463 | 9/1970 | Turner | 43/6 X |
| 3,945,642 | 3/1976 | Henthorn | 43/6 X |

Primary Examiner—Peter M. Cuomo
Assistant Examiner—John A. Ricci
Attorney, Agent, or Firm—Macdonald J. Wiggins

[57] ABSTRACT

A metal arrowhead has a ferrule section for permanent attachment to the distal end of an arrow shaft and a point section selectively joined to the ferrule section. A spring catch assembly disposed in the ferrule section permits the point section to be quickly disconnected from the arrow shaft. Barbs on the point section captivate a fish and permit a tether line attached to the arrow to permit the fish to be landed. When the point section is removed from the shaft, the shaft may be pulled from the fish and the point section quickly re-attached.

14 Claims, 2 Drawing Sheets

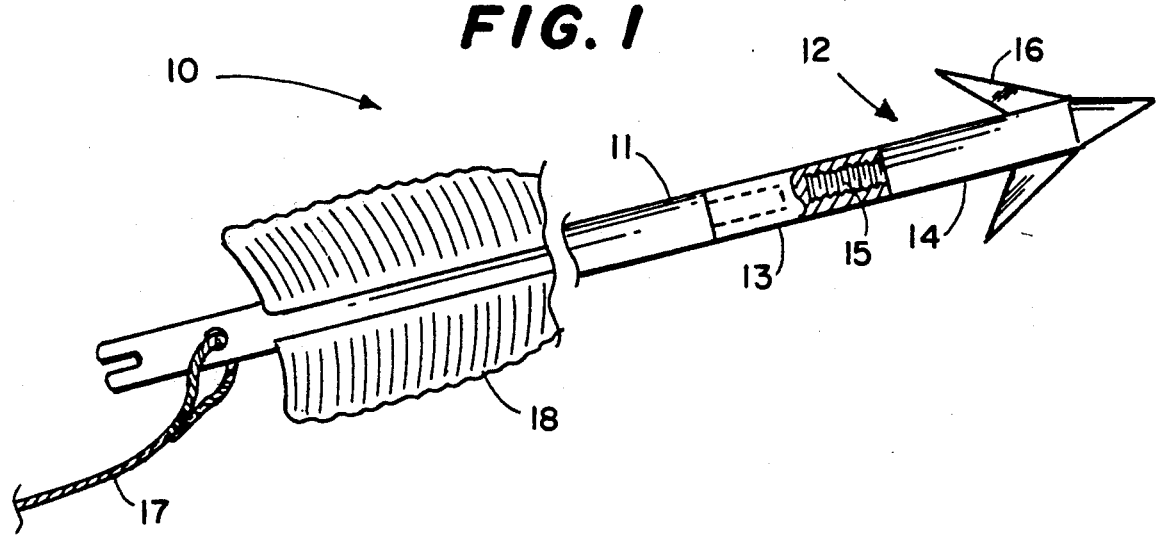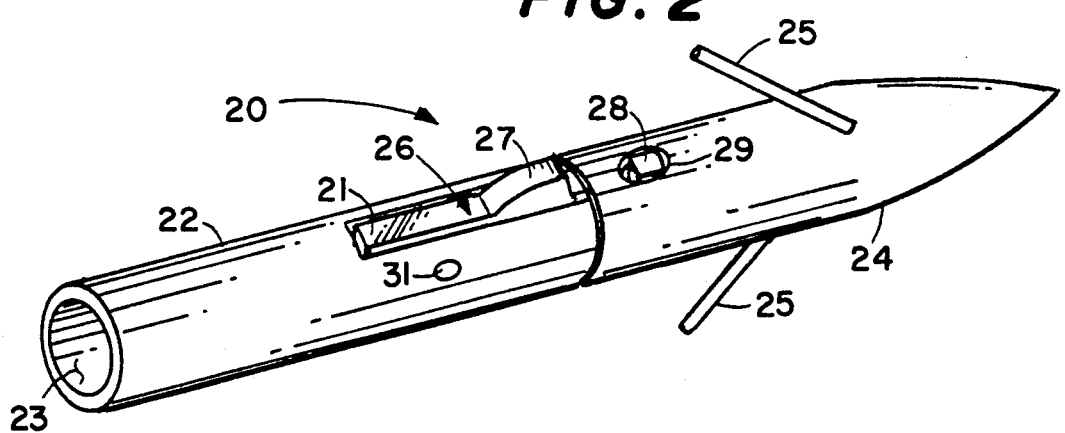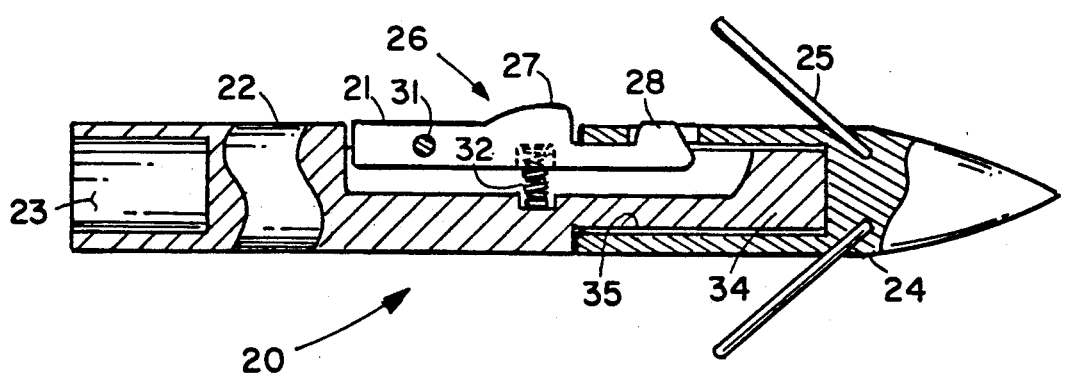

ARROWHEAD FOR BOW FISHING ARROWS

BACKGROUND OF THE INVENTION

1. Field of the Invention

The present invention relates to hunting arrows and more particularly to a removable arrowhead and a removable nock for such arrows.

2. Description of the Prior Art

Hunting and fishing with a bow is a widely enjoyed sport. When fishing with bow and arrow, an arrow is used having a line attached thereto such that the speared fish can be recovered. Arrowheads used for bow fishing arrows necessarily have barbs such that the arrow will penetrate the fish and will not be withdrawn from the fish's body when the arrow is recovered by reeling in the line. Prior art fishing arrows generally utilize a metal ferrule attached to the forward end of the arrow having a threaded portion and the arrowhead includes a mating threaded portion. To remove the fish from the arrow after a catch, the fisherman must unscrew the arrowhead from the ferrule; thereafter, withdrawing the headless arrow shaft from the fish. Before continuing bow fishing, the archer must thread the arrowhead back onto the shaft.

This procedure is relatively inconvenient, particularly in the cases where a fish is thrashing about and the archer's hand may be slippery. Thus, there is a need for an arrow design which will permit the arrow shaft to be very quickly removed from the fish and the arrow reassembled quickly to continue fishing. Various types of arrows having removable arrowheads have been described in the prior art, but none appear suitable to solve the above described problem. Chandler, in U.S. Pat. No. 2,289,284, discloses an arrow having a head attached by means of a tapered end of the arrow shaft fitting into a tapered ferrule socket on the head. The head is secured by a line to the rear portion of the arrow shaft. The purpose of the design is to permit the arrow shaft to be removed from the head before reeling in the fish by tugging on the line. The arrowhead must be pulled back through the fish after landing to remove the head from the line. U.S. Pat. No. 2,796,691 to Norris discloses an arrowhead held to the shaft by a magnet and having a line attached to the head and also to the shaft. The problem being solved by Norris is that of the fish thrashing to free itself prior to reeling in of the catch with the danger of damaging the arrow. The movement of the fish breaks the head loose from the magnet. Fishing gigs and the like having removable heads are shown in the following patents: Raithel, U.S. Pat. No. 1,581,321; Garrison, U.S. Pat. No. 2,236,427; Hertel, U.S. Pat. No. 2,758,405; Gay, U.S. Pat. No. 3,004,362; and Guidry, U.S. Pat. No. 3,405,472. None of these patents disclose structure suitable to solve the present problem.

SUMMARY OF THE INVENTION

The present invention includes an arrowhead formed of aluminum or other metal in two sections. A first section has a cylindrical body having a diameter essentially equal to the diameter of the arrow shaft. A ferrule is formed at the proximal end of the body section to fit over the distal end of the shaft. The ferrule is cemented or otherwise permanently attached to the shaft.

The distal end of the body section has a reduced diameter which fits snugly into a second arrow point section. The point section has a main diameter equal to that of the body section which tapers to a point at its distal end. A counterbore in the proximal end of the point section snugly fits the reduced diameter portion of the body section. The forward part of the point section includes a set of barbs of any desired design. The body section includes a longitudinal groove milled therein extending into the reduced diameter portion thereof. A small, spring loaded catch is disposed within the milled groove and pivoted at the rear end of the catch. A hook at the forward end of the catch extends within the counterbore portion of the arrow point section and engages an opening through the wall of the counterbored portion. A small thumb button on the catch extends slightly beyond the circumference of the body section when the point section and the body section are engaged. To release the point section, the button is depressed which releases the catch hook and permits the point section to be slipped off the reduced body portion.

The point section is installed onto the body section prior to use of the arrow. A line is attached to the proximal end of the arrow. Upon shooting a fish with the arrow, the point will penetrate through the fish's body. When the line is reeled in, the arrow head barbs permit the fish to be pulled in. To release the fish from the arrow, the archer pushes the arrow shaft forward to move the fish up along the shaft, presses the release catch button, and removes the arrow point section from the body portion. The arrow shaft can then be pulled rearwardly from the fish's body. The arrow point section may then be quickly returned to the forward end of the arrow shaft and the archer is ready for another try.

In an alternative version of the invention, an aluminum nock is constructed having two cylindrical sections which mate together using a catch identical to that described above with respect to the arrowhead version of the invention. A forward section of the nock is permanently attached to the proximal end of the arrow and the line used to captivate the arrow is attached to the rear removable section of the nock. After catching and reeling in a fish as previously described, the catch button is depressed permitting the arrow head, arrow shaft, and fish to be removed from the nock and line. In this instance, the archer then grasps the arrow near its head and pulls it forward through the fish to release the fish. At that point, the nock section is reengaged with the shaft portion.

As will not be recognized, the removing of a fish from a fishing arrow and readying the arrow for further use with either version of the invention may be done in a matter of a few seconds.

It is therefore a principal object of the invention to provide an arrowhead and a nock for a bow fishing type arrow which permits a fish to be quickly removed from the arrow shaft and the arrow prepared for future use in a minimum of time.

It is another object of the invention to provide a two piece arrowhead in which a first portion is permanently attached to the distal and of the arrow shaft and a point portion having barbs is attached to the first portion by an easily operated catch.

It is still another object of the invention to provide a two piece nock in which a first section of the nock is permanently attached to the proximal end of an arrow shaft and the second section having a nock for the string is attached to the first section by means of an easily operated catch; wherein the line is attached to the nock section to permit a fish to be removed from the shaft by releasing the nock section and pulling the arrow forward through the fish.

It is yet another object of the invention to provide an arrow for bow fishing in which the fish can be removed from the arrow shaft more quickly than previously possible.

These and other objects and advantages of the invention will become apparent from the following description when read in conjunction with the drawings.

BRIEF DESCRIPTION OF THE DRAWINGS

FIG. 1 is a perspective view of a prior art arrow used for bow fishing;

FIG. 2 is a perspective view of the arrow head of the invention;

FIG. 3 is a cross sectional view of the arrow head of FIG. 1;

DETAILED DESCRIPTION OF THE PREFERRED EMBODIMENT

Figure 4:
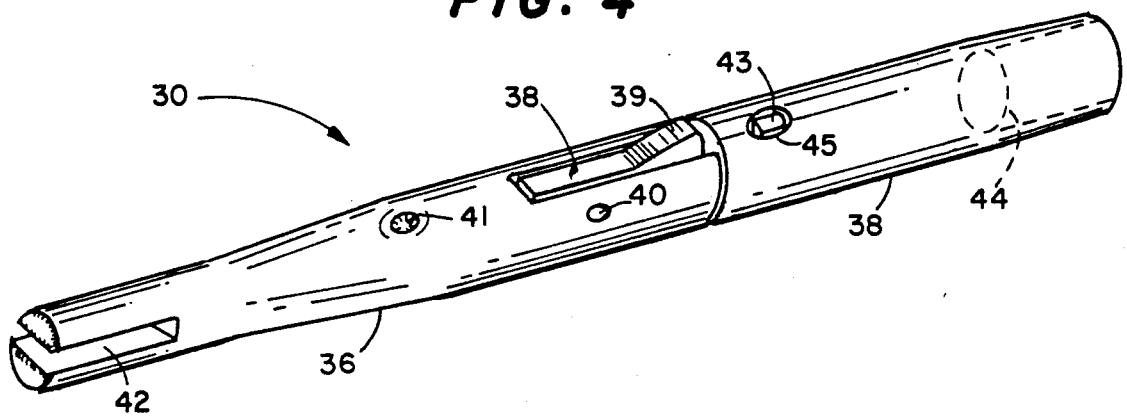
FIG. 4 is a perspective view of a nock for a fishing arrow in accordance with the invention.

Referring to FIG. 1, a view of a typical prior art arrow 10 used by bow fisherman is shown with a portion thereof indicated in cross section. Arrow 10 includes a shaft 11 having a two piece arrowhead 12 attached to the distal end thereof. A first section 13 of arrowhead 12 includes a ferrule cemented or otherwise attached to the distal end of shaft 11. The forward portion of section 13 shown in cross section includes a female thread. Point section 14 of arrowhead 12 includes a threaded stud 15 which screws into the female thread of section 13. A set of barbs 16 is provided at the point end of arrowhead 12 such that when the arrow penetrates the fish, the arrow and the fish may be retrieved by reeling in line 17 attached to the nock end of arrow shaft 11. Arrow 10 is shown having fletching 18 is shown in FIG. 1. However, bow fishing arrows may omit the fletching.

FIGS. 2 and 3 disclose details of an arrowhead version of the invention. In this aspect of the present invention, the arrowhead 12, such as used in the prior art, is replaced by an improved arrowhead 20 having a cylindrical ferrule portion 22. Ferrule 22 includes a counterbored proximal end 23. Ferrule 22 is permanently attached to the distal end of an arrow shaft, such as shaft 11 in FIG. 1. The distal end 34 of ferrule 22 seen in FIG. 3 is cylindrical and of a reduced diameter. Arrow point portion 24 of arrowhead 20 is cylindrical having the same diameter as ferrule 22 and tapers to a point as shown. The proximal end of arrow point section 24 has a counterbore 35 which snugly fits distal end 34 of ferrule 22. Ferrule 22 includes a slot 33 milled longitudinally along its forward end. A thumb catch 26 has an elongate member 21 which fits into slot 33 and is pivoted about pin 31. Catch 26 includes a hook portion 28 at the forward end of member 21, and a thumb button 27. As will be noted, the thumb button extends slightly above the surface of ferrule 22, and is maintained in a raised position by a compression spring 32.

When arrowhead 20 is in the assembled condition shown in FIGS. 2 and 3, point section 24 is held firmly in place by hook 28 of thumb catch 26 which engages opening 29 into counterbore 35. Arrowhead 20 is used with a tethered arrow of the type described with reference to FIG. 1. After the arrow is shot and penetrates a fish, the arrow is pushed through the fish along the arrow shaft such that the fish is clear of arrow point 20. The archer then presses thumb button 27 which releases hook 28, permitting arrow point section 24 to be slipped off of distal end 34 of ferrule 22. At that point, the arrow shaft is pulled through and free of the fish, and arrow point section 24 is reinstalled on distal end 34 with opening 29 aligned with hook 28. The tapered forward face of hook 28 permits arrowhead 24 to be snapped into place quickly and easily. At this point, the arrow is free for another attempt.

Although a compression coil spring 32 is shown, other types of springs such as leaf springs may also be used. It is also to be understood that any type of barb 25 is suitable for use with the invention. Arrowhead 20, in accordance with the invention, may be constructed from aluminum, steel, brass, or other suitable metal. Other materials, such as rigid plastic, may be suitable for some purposes.

Figure 5:
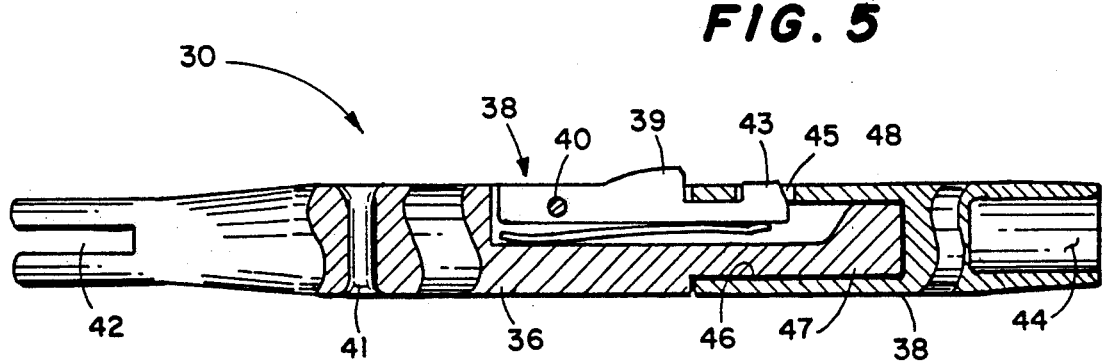
FIG. 5 is a cross sectional view of portions of the nock of FIG. 4.

Turning now to FIGS. 4 and 5, an alternative embodiment of the invention is shown. A two section cylindrical nock assembly 30 is shown having a nock section 36 and a ferrule section 38. Nock section 36 includes a nock 42 at its proximal end to accommodate a bow string. A hole 41 is provided through nock section 36 forward of nock 42 for accepting a line such as line 17 of FIG. 1. The distal end 47 of nock section 36 has a reduced diameter as compared with the rear portion thereof which fits into a counterbore 46 of ferrule section 38 in a manner as described with respect to FIGS. 2 and 3 above. Counterbore 44 of ferrule 38 is provided to be permanently attached to the arrow shaft such as shaft 11 in FIG. 1 to the rear of fletching 18, if used. A groove 48 is milled longitudinally in nock section 36 and catch 38 is disposed therein and pivoted thereto by pin 40. Hook portion 43 engages opening 45 in the wall of counterbore 46 of ferrule 38. A leaf spring 48 maintains catch 38 in its raised position as shown wherein thumb button 39 extends slightly above the outer surface of nock section 36. Thus, nock section 36 is maintained securely connected to ferrule 38 in the condition shown in the figures.

A prior art arrow, such as shown in FIG. 1, may have the nock assembly 30 of the invention added thereto. When a fish is retrieved, thumb button 39 is depressed permitting nock section 36 to be removed from ferrule 38. The arrow head portion 12 of the arrow is grasped and the shaft 11 withdrawn from the fish. At that point, nock section 36 can be snapped back in place in ferrule 38 to be ready for further use.

Although the invention has been described with reference to specific structures, these are to be considered for exemplary purposes only and various modifications or variations may occur to those of skill in the art without departing from the spirit and scope of the invention.

I claim:

1. An arrowhead for bow fishing for attachment to an arrow shaft, said shaft having a tether line connected thereto, comprising:
    a forward arrowpoint section having barbs, a cylindrical proximal end and a pointed distal end, said proximal end having a counterbore;
    a rearward ferrule section for permanent attachment to said arrow shaft, said ferrule section and said arrowpoint section adapted to be engaged during use, said ferrule section having a cylindrical proximal end for attachment to said arrow shaft, a distal end having a diameter to fit said counterbore of said arrowpoint section, and a longitudinal groove extending into said distal end thereof;

spring catch means disposed in said ferrule section for selectively holding said ferrule section and said arrowpoint section in engagement, said catch means including quick release means for permitting separation of said arrowpoint section from said ferrule section, including an elongate member disposed in said groove and having a pivot in said ferrule section, and a hook portion at a forward end in said arrowpoint section, said elongate member biased outward by a spring; and said proximal end of said arrowpoint section having an opening through a wall of said counterbored portion for engaging said hook.

2. The arrowhead as defined in claim 1 in which said elongate member includes a thumb button portion to permit depressing for releasing said hook from said opening.

3. The arrowhead as defined in claim 1 in which said spring is a coil spring.

4. The arrowhead as defined in claim 1 in which said spring is a leaf spring.

5. The arrowhead as defined in claim 1 in which said arrowpoint section and said ferrule section are formed of metal.

6. The arrowhead as defined in claim 5 in which said metal is aluminum.

7. An arrowhead for bow fishing arrows and the like, in which an arrow shaft is tethered, comprising:

a point section having a generally cylindrical proximal end and a pointed distal end, said proximal end having a counterbore and catch-engaging opening communicating with said counterbore;

barbs attached to said point section;

a generally cylindrical ferrule section having a proximal end adapted to be permanently attached to the forward end of said arrow shaft, and a distal end of a smaller diameter than said proximal end to fit into said counterbored proximal end of said point section, said ferrule section having a longitudinal groove extending into said distal end; and catch means disposed within said groove in said ferrule section and having a hook portion for engaging said opening when said ferrule section has its distal end inserted into said counterbore, said catch means including means for releasing said hook portion to permit said point section to be separated from said ferrule section.

8. The arrowhead as defined in claim 7 in which:

said catch means includes an elongate member disposed in said groove and having a pivot in said ferrule section, and said hook portion at a forward end thereof, said elongate member biased outward by a spring.

9. The arrowhead as defined in claim 8 in which said elongate member includes a thumb button portion to permit depressing for releasing said hook portion from said opening.

10. An arrowhead for bow fishing for attachment to an arrow shaft, said shaft having a tether line connected thereto, comprising:

a forward arrowpoint section having barbs;

a rearward ferrule section for permanent attachment to said arrow shaft, said ferrule section and said arrowpoint section adapted to be engaged during use;

spring catch means disposed in said ferrule section for selectively holding said ferrule section and said arrowpoint section in engagement, said catch means including quick release means for permitting separation of said arrowpoint section from said ferrule section;

said arrowpoint section having a cylindrical proximal end and a pointed distal end, said proximal end having a counterbore;

said ferrule section having a cylindrical proximal end for attachment to said arrow shaft, and a distal end having a diameter to fit said counterbore of said arrowpoint section and a longitudinal groove extending into said distal end thereof;

said spring catch means includes an elongate member disposed in said groove and having a pivot in said ferrule section, and a hook portion at a forward end in said arrowpoint section, said elongate member biased outward by a spring; and said proximal end of said arrowpoint section having an opening through a wall of said counterbored portion for engaging said hook; and means for operating said elongate member for releasing said hook from said opening.

11. The arrowhead as defined in claim 10 in which said spring is a coil spring.

12. The arrowhead as defined in claim 10 in which said spring is a leaf spring.

13. The arrowhead as defined in claim 10 in which said arrowpoint section and said ferrule section are formed of metal.

14. The arrowhead as defined in claim 13 in which said metal is aluminum.

* * * * *